July 13, 1937.  J. F. MEEK  2,086,943
INTERMITTENT MOTION AND FRAMING DEVICE
Filed Nov. 9, 1934   2 Sheets-Sheet 1

Inventor
J. F. Meek
By Clarence A. O'Brien
Attorney

July 13, 1937.　　　　J. F. MEEK　　　　2,086,943
INTERMITTENT MOTION AND FRAMING DEVICE
Filed Nov. 9, 1934　　　2 Sheets-Sheet 2

Inventor
J. F. Meek
By Clarence A. O'Brien
Attorney

Patented July 13, 1937

2,086,943

UNITED STATES PATENT OFFICE 2,086,943

INTERMITTENT MOTION AND FRAMING DEVICE

John Franklyn Meek, Topeka, Kans.

Application November 9, 1934, Serial No. 752,342

3 Claims. (Cl. 88—18)

My invention relates generally to motion picture projectors, and particularly to an intermittent motion and framing device therefor, and an important object of my invention is to provide for changing or correcting the centering of the frames of the film relative to the projection aperture without interrupting the intermittent motion, and to provide gradual acceleration at the beginning of the moving of the film frame into position in a manner to eliminate the jerk and consequent damage to film sprocket holes.

It is also an important object of my invention to provide an intermittent motion and a framing device of the character described which can be arranged to produce any desired speed or acceleration of motion.

It is also an important object of my invention to provide apparatus of the character indicated above which is composed of few and simple parts, eliminating a large number of delicate and expensive parts.

Other objects and advantages of my invention will be apparent from a reading of the following description in connection with the drawings, wherein for purposes of illustration I have shown a preferred embodiment of my invention.

In the drawings:—

Figure 1:
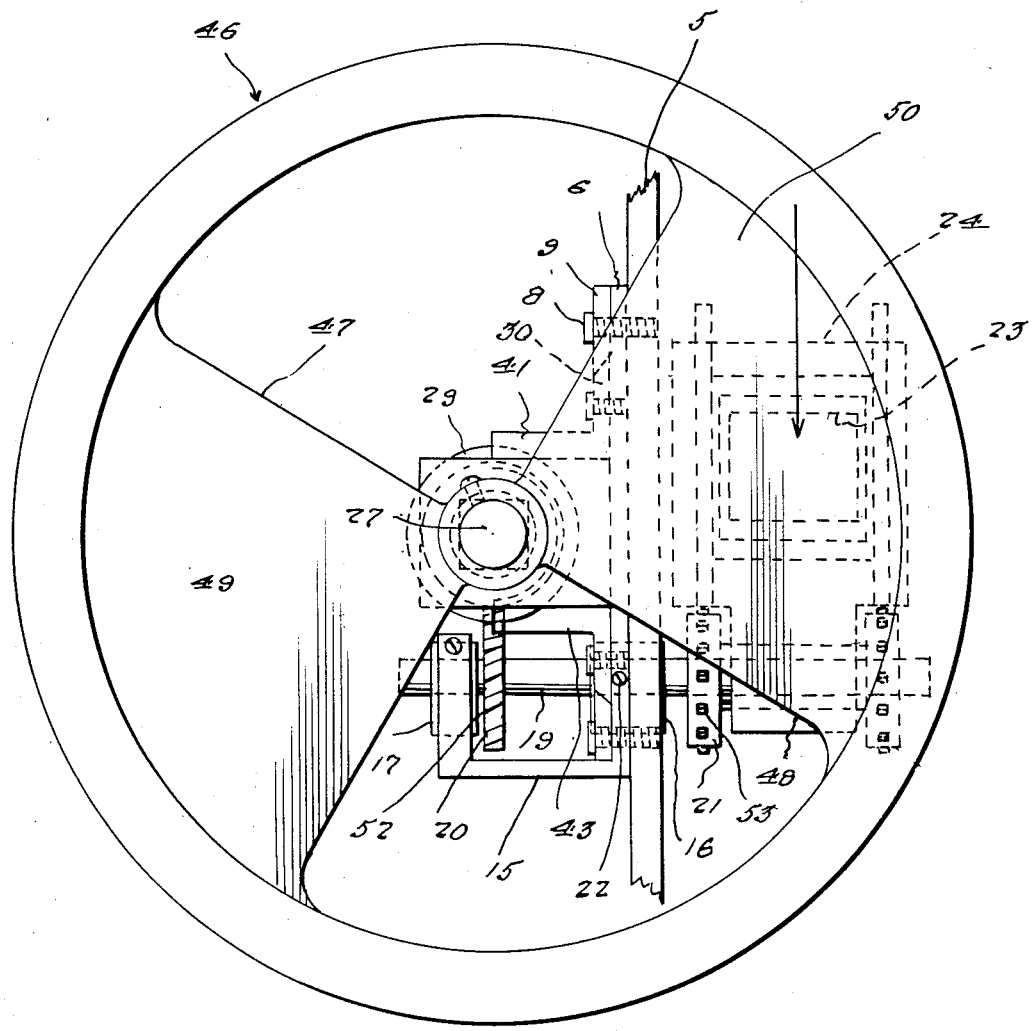
Figure 1 is a back elevational view of the device.
Figure 4:
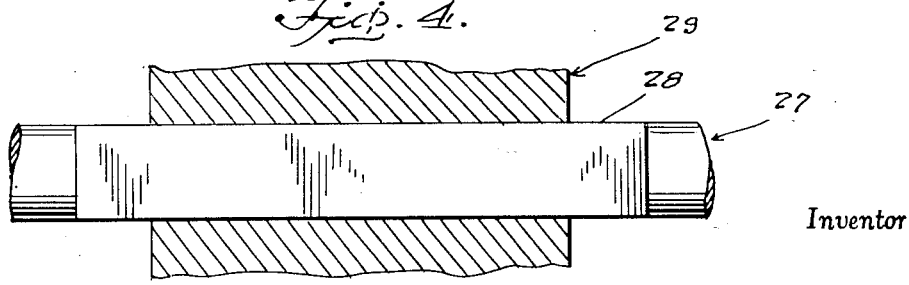
Figure 4 is a longitudinal sectional view through the cam showing the square portion of the cam shaft on which it is mounted.

Referring in detail to the drawings, the numeral 5 refers generally to the main casting of the projector, and the left side thereof on which is mounted a plate 6 having secured by screws 7, 8 to its upper part the guide 9 which has the beveled lower edge 10 forming a guide, and the lower guide plate 11 similarly secured by screws 12, 13 to the lower part of the plate 6 and having the beveled upper edge as indicated at 14.

In plate 6, is a rotatable eccentric bearing 16 locked by a screw 22, and from the lower edge of the plate 6 there projects outwardly the L-shaped bracket 15, which has a rotatable eccentric bearing 17 mounted therein arranged to be locked by the set screw 18, in which bearings are journaled the intermittent shaft 19.

Between the eccentric bearings 16, 17 the intermittent shaft 19 carries the pinion 20, and on the far side of the main casting 5, the intermittent shaft has fixed thereto the sprocket 21, which carries the film in the usual manner in front of the projecting aperture 23 which is part of the projector generally designated 24.

Projecting from the outer side of the plate 6, are the bearings 25, 26, which carry the cam shaft 27 which is driven by any suitable means known in the art, and has between the bearings 25, 26, the squared portion 28, on which slides the timing cam 29.

The slide 30 has beveled edges corresponding to the beveled edges of the upper and lower guides 9, 11, respectively, with which they are slidably engaged, and the slide 30 is held in place in longitudinally slidable manner by means of bolts or screws 32, 33, working in upper slots 34, 35, in the plate 6, and by screws 36, 37, working in lower slots 38, 39, in the plate 6. The upper part of the slide 30 which is shown broken off in Figure 2 is to be operatively connected by any suitable arrangement to means (not shown) such as the projection arm for shifting the slide 30 to produce the desired adjustment of the framing position.

Extending outwardly from the slide plate 30 are arms 40, 41, 42 and 43 which have their inner edges semi-circularly formed to embrace the cam 29 and engage the plain grooves 44, 45 at the opposite ends of the cam.

Mounted on the back end of the cam shaft 27, is a shutter balance wheel 46 which has openings 47, 48 and webs 49, 50 to act as shutters as the cam shaft is rotated, the combined shutter and balance wheel 46 being held in place by the set screw 51.

Figure 2:
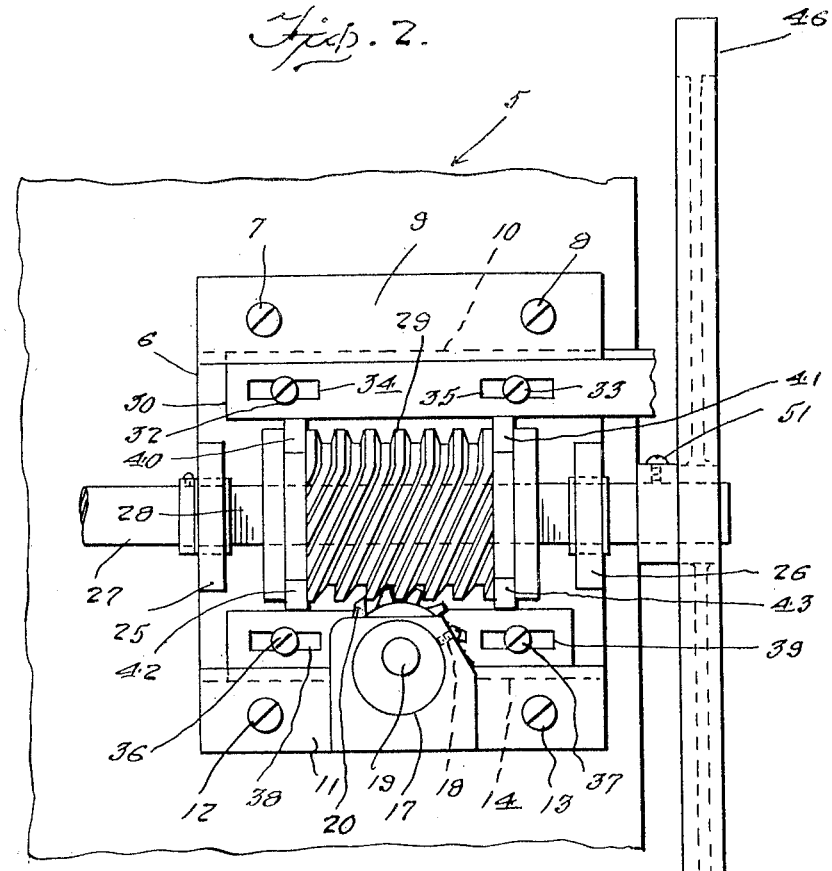
Figure 2 is an elevational view of the left side of the device.
Figure 3:
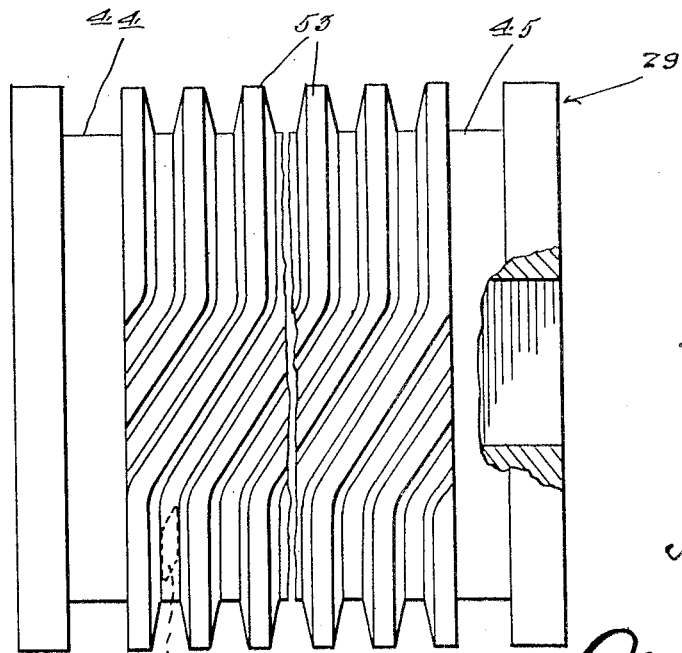
Figure 3 is an enlarged view of the cam.

The pinion 20 has twelve (12) solid teeth 52 cut diamond-shaped, as shown in Figure 2, which may be of suitable friction reducing construction, so as to engage the sides of the truncated triangular cross section ribs 53 in the manner shown in Figure 3 which are formed around and along the cam 29. The ribs 53 between adjacent ones of which the teeth of the pinion engage run for three quarters of the circumference of the cam in a regular straight course at right angles to the axis of the cam, and then run at an acute angle thereto for the remaining fourth of the circumference of the cam so as to produce the desired vector motion of the teeth of the pinion engaged with the cam. By changing the angle of divergence of the ribs on the cam from the normal circumferential right angular direction, alteration of the intermittent motion may be secured.

It will be observed that as the cam shaft 27 is driven in the regular manner, the cam 29 will be revolved by reason of its location on the squared portion 28 of the cam shaft thereby causing uniform rotation of the pinion 20, and hence the shaft 19 under control of the projecting arm of the slide 30, the slide 30 being thereby capable of being shifted back and forth to correctly place the frame of the film over the aperture of the projector. In being thus moved the slide 30 will slide back and forth in the guides 9, 11 and consequently carry the cam along the squared portion of the cam shaft to an adjusted position.

The teeth 53 of the film sprocket spool are triangular in side elevation and are rectangular at the base and these teeth are arranged and spaced on the periphery of the flanges of the film spool in much the same manner as triangular saw teeth. The described formation and arrangement of the sprocket teeth 53 enables them to enter and leave the sprocket holes in the film without danger of tearing the film even should the sprocket holes in the film fail to be exactly aligned for reception of the sprocket teeth.

It will be understood that the parts described are to be of such size and arrangement that the desired relative motions are procured throughout the range of adjustment of the cam, at the proper speed.

Although I have shown and described herein a preferred embodiment of my invention, it is to be definitely understood that I do not desire to limit the application of the invention thereto, and any change or changes may be made in materials and in structure, and in the arrangement of parts, within the spirit of the invention and the scope of the subjoined claims.

What is claimed is:

1. In a motion picture projector including a support and an aperture, an intermittent motion and framing device, said device comprising a cam shaft having thereon a rotary shutter in operative relation to said aperture, a cam on said cam shaft, said cam being slidably adjustable along said cam shaft and fixed for rotation with said cam shaft, bracket means connected with said support and with said cam, said bracket means being adjustable to adjust said cam along said cam shaft and hold said cam in the selected position on said cam shaft; a second shaft, said second shaft extending in a direction non-normal to the axis of said cam shaft, eccentric bearings carrying said second shaft, and a rotary member fixed on said second shaft and operatively engaged by said cam, said eccentric bearings being mounted on said support and rotatably adjustable to increase or decrease the operative engagement of said rotary member with said cam.

2. In a motion picture projector including a support and an aperture, an intermittent motion and framing device, said device comprising a cam shaft having thereon a rotary shutter in operative relation to said aperture, a rotary cam on said cam shaft including longitudinally spaced circumferential grooves, said cam being slidably adjustable along said cam shaft and fixed for rotation with said cam shaft, bracket means connected with said support and with said cam, said bracket means being adjustable to adjust said cam along said cam shaft; a second rotary shaft, eccentric bearings carrying said second shaft, and a rotary member fixed on said second shaft and having radial teeth operatively engaged with some of the grooves of said cam, said eccentric bearings being mounted on said support and rotatably adjustable to increase or decrease the operative engagement of said radial teeth of the rotary member with the grooves of the cam, said grooves having portions of the cam lying at right angles to the axis of the cam and other portions merging into the first mentioned portions thereof and lying at an acute angle to the axis of the cam.

3. In a motion picture projector including a support and an aperture, an intermittent motion and framing device, said device comprising a cam shaft having thereon a rotary shutter in operative relation to said aperture, rotary cam on said cam shaft including longitudinally spaced circumferential grooves, said cam being slidably adjustable along said cam shaft and fixed for rotation with said cam shaft, bracket means connected with said support and with said cam, said bracket means being adjustable to adjust said cam along said cam shaft and hold said cam in the selected position on said cam shaft; a second rotary shaft, eccentric bearings for said second shaft, and a rotary member fixed on said second shaft and having radial teeth operatively engaging with some of the grooves of said cam, said eccentric bearings being mounted on said support and rotatably adjustable to increase or decrease the operative engagement of said radial teeth with the grooves of the cam, said grooves having portions lying at right angles to the axis of the cam and other portions merging into the first mentioned portions thereof and lying at an acute angle to the axis of the cam, said grooves and said radial teeth being arranged to produce continually an engagement of at least two of said radial teeth with two of the grooves.

JOHN FRANKLYN MEEK.